UNITED STATES PATENT OFFICE.

JOSEF ZIEGLER, OF BIEBRICH, GERMANY.

CHINOLINCHINOPHENOL-SULPHATE AND METHOD OF OBTAINING SAME.

SPECIFICATION forming part of Letters Patent No. 486,363, dated November 15, 1892.

Application filed September 14, 1891. Serial No. 405,679. (No model.)

*To all whom it may concern:*

Be it known that I, JOSEF ZIEGLER, of Biebrich, in the Kingdom of Prussia and German Empire, have invented a new and useful Process of Manufacturing Chinolinchinophenol-Sulphate, of which the following is a specification.

This invention relates to a process of manufacturing chinolinchinophenol-sulphate. After having succeeded in obtaining oxychinolin in a much simpler manner than before it became obvious that this substance might be employed for disinfecting purposes with very great advantage if it could by any available means be obtained in a soluble form. I have accordingly instituted a series of investigations and experiments which have enabled me to prepare a new soluble salt or derivative of oxychinolin which forms, among other things, a most valuable disinfectant.

The soluble substance which I have obtained and which is the subject of this invention is chinolinchinophenol-sulphate, (chinophenol-sulphute of chinolin,) and it may be prepared in the manner hereinafter described.

To a solution of two hundred and seventy-six kilos of orthoxychinolin-sulphate in seven hundred and two liters of water I add one hundred and twenty-nine kilos of chinolin and boil the mixture in a suitable vessel provided with an inverted condenser until a sample taken from the bulk after having been cooled appears clear and when shaken in ether none of the sample becomes dissolved therein.

Instead of proceeding as hereinbefore described I may produce the chinolinchinophenol-sulphate by heating one hundred and twenty-nine kilos of chinolin with ninety-eight kilos of sulphuric acid of about 66° Baumé and two hundred and thirty-eight liters of water, thus producing the known sulphate of chinolin. To this about five hundred liters of water and one hundred and forty-five kilos of orthoxychinolin are added and the whole is boiled until complete combination occurs—that is to say, until a test sample treated with ether gives neither free chinolin nor oxychinolin. In any case it is unnecessary to first prepare either the sulphate of chinolin or the sulphate of oxychinolin in the solid form, as either of these substances may be combined with the chinolin or with the oxychinolin directly in an aqueous solution or in aqueous solutions. The same resulting compound is always obtained and it may be sold and used in the original solution. If it be desired to obtain the substance in the solid form, the solution may be heated in a vacuum-pan at temperatures below 100° centigrade and carefully evaporated until a yellow solid is obtained; or sulphate of oxychinolin, ($C_9H_7NO\text{-}H_2SO_42H_2O$,) which may be obtained by the process covered by my patent, No. 466,708, of January 5, 1892, may be heated in molecular proportions with chinolin until the chemical combination of the two substances has been effected.

The chinolinchinophenol-sulphate when carefully evaporated is a sulphur-yellow powder possessing a slight odor of chinolin, very readily soluble in water, forms a thick mass at 96° centigrade, and is fusible at 114° centigrade.

The watery solution of the compound when combined with trichloride of iron assumes a blue-green color, which on the addition of hydrochloric acid disappears and changes to a bright yellow. When an excess of hydrate of potassium or soda is added to the watery solution, chinolin separates out in the form of oil, while chinophenol or oxychinolin remains in the solution in the form of a salt of soda. The chinolin can be separated by means of a separating-funnel or by steam. When sufficient acetic acid is added to the solution to produce a slight acid reaction, the oxychinolin falls out. In the solid state the compound externally resembles fused chloride of iron, and, like this substance, it can be preserved in this state only in the absence of moisture, as it is very hygroscopic.

The formula for chinolinchinophenol-sulphate is as follows:

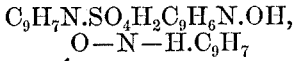
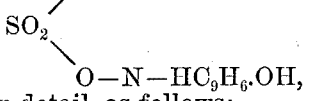

or, more in detail, as follows:

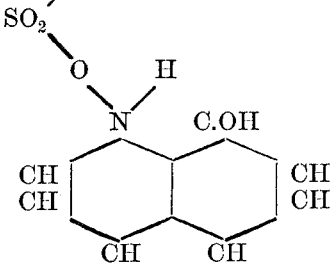

What I claim, and desire to secure by Letters Patent of the United States, is—

1. The herein-described method of producing a soluble salt—chinolinchinophenol-sulphate—from orthoxychinolin and chinolin, which consists in heating a mixture of one of said substances and a sulphate of the other, substantially as described.

2. As a new article of manufacture, the sulphur-yellow powder of chinolinchinophenol-sulphate possessing a slight odor of chinolin very readily soluble in water, forming a thick mass at 96° centigrade, which is fusible at 114° centigrade, and having the formula hereinbefore set forth.

In witness whereof I have hereunto set my hand in presence of two witnesses.

JOSEF ZIEGLER.

Witnesses:
ALVESTO S. HOGUE,
FRANK H. MASON.